April 18, 1950

H. E. MARVEL 2,504,433

LIQUID DISPENSING APPARATUS, INCLUDING
REPEATING STOP MECHANISM

Filed Nov. 18, 1944

HARVEY E. MARVEL
INVENTOR.

BY Edmund W. E. Kamm

HARVEY E. MARVEL
INVENTOR.

HARVEY E. MARVEL
INVENTOR.

BY Edmund W. E. Kamm

Patented Apr. 18, 1950

2,504,433

UNITED STATES PATENT OFFICE 2,504,433

LIQUID DISPENSING APPARATUS, INCLUDING REPEATING STOP MECHANISM

Harvey E. Marvel, Fort Wayne, Ind., assignor to Bowser, Inc., Fort Wayne, Ind., a corporation of Indiana Application November 18, 1944, Serial No. 564,130

23 Claims. (Cl. 222—14)

This invention relates to an improvement in an apparatus for automatically delivering liquids into containers in measured, predetermined quantities. More specifically, it relates to apparatus for repeatedly delivering the same amount of measured liquid into a series of containers.

In various industries it is common practice to fill barrels, drums, cans, etc., by means of a meter-controlled quantity predetermining mechanism, actuated by the operator. The place of fill may be somewhat removed from the predetermining mechanism and consequently, it is highly advantageous to provide means which enable the operator to actuate the device from a remote station. Due to the inconvenience of mounting the controls on the predeterminer proper, where they are out of reach of the operator, it is advantageous to have remote controls of the predeterminer located at the discharge nozzle.

It is customary to fill the containers in batches. The containers of one batch are all of the same capacity, but those of one batch may be of different capacity than those of another. Consequently, it is advantageous to have a repeat quantity and a selective predetermining mechanism which may be adjusted to dispense different quantities.

It is also customary to position the containers by means of a conveyor and the position of the fill openings will vary with each succeeding contained. Therefore, it is desirous to have flexibility in regard to positioning the discharge nozzle.

In rapid filling of the container, particularly those having a restricted fill, there is a tendency for the liquid to boil or splash, with the resultant soiling of the exterior of the container, and short measure. For the elimination of the foregoing, it is advantageous to reduce the flow of liquid into the container as the liquid approaches the top of the container.

The applicant has devised an apparatus which delivers measured predetermined quantities as selected by the operator in accordance with the capacity of the containers to be filled. All operating controls are conveniently located at the discharge nozzle. Applicant has provided flexibility of fill position and also a reduced rate of flow near the end of the predetermined delivery to avoid spillage and short measure, and has provided a totalizer for accumulating the total amount of liquid delivered in the successive operation.

Applicant prefers to use a volumetric displacement meter as the measuring device, and this meter is preferably adjustable to compensate for both the temperature and the coefficient of cubic expansion. Such a meter is disclosed in the application of C. P. Griffith, et al, Serial Number 352,136 now Patent 2,366,330.

It is, accordingly, an object of applicant's invention to provide an apparatus for discharging a predetermined quantity of liquid into a container.

It is another object of the invention to provide a quantity predetermining apparatus having a wide range of selective quantities.

Another object of the invention is to provide a repeating quantity predetermining device which will make a series of deliveries of the preselected quantity.

Yet another object of the invention is to provide a repeating predetermined mechanism which can be remotely controlled.

Still another object of the invention is to provide a throttling valve, controlled by the predetermined mechanism, for reducing the flow of liquid into the container as the quantity of liquid discharged approaches the predetermined quantity.

Still another object of the invention is to combine the meter, the predeterminer, the discharge nozzle, the throttling valve, the hose and the linkage between the discharge nozzle and the predeterminer and between the predeterminer and the throttling valve as a working unit used in filling containers.

Yet another object of the invention is to provide a presettable predetermining mechanism in which any one of one hundred quantities may be preselected.

Still another object of the invention is to provide a mechanism of the type described which is automatically reset at the conclusion of the delivery of the preselected quantity.

It is yet another object of the invention to provide an automatically reset mechanism having a manually-opened valve, but which automatically closes said valve when the required quantity of liquid has been dispensed.

It is still another object of the invention to provide a mechanism of the kind described in which the velocity of flow is reduced prior to the completion of delivery and in which the volume delivered at slow flow may be adjusted to secure the most efficient delivery cycle.

Still another object of the invention is to provide a planetary gear train drive for the stop mechanism which permits a wide range of selectivity.

These and other objects will become apparent from a study of this specification and the drawings which are attached hereto and made a part hereof, and in which.

Predeterminer

Figure 1:
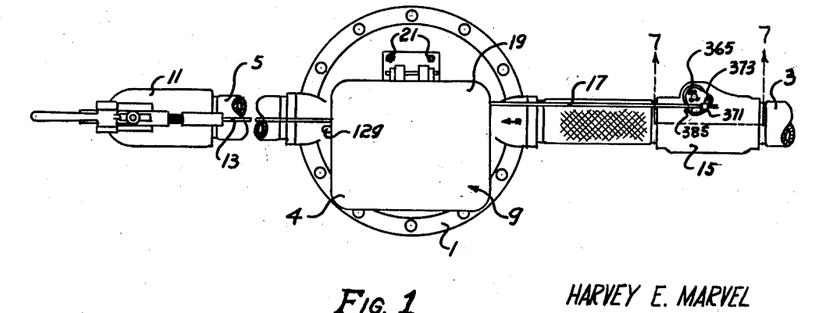
Figure 1 is a plan view showing the predetermining mechanism, meter, discharge valve, and the throttling valve, all in assembled relation.

Referring first to Figure 1, the numeral 1 indicates a meter for measuring the volume of liquid entering through conduit 3 and discharging from the meter into conduit 5. Applicant prefers to use a volumetric displacement meter which is provided with adjustments for compensating for the temperature and coefficient of cubic expansion of the liquid being measured. Such a meter is disclosed in the application Serial Number 352,136 filed by C. P. Griffith.

Mounted on and directly driven by the meter output shaft through coupling 7 (Figure 3) is a repeat predetermining mechanism generally indicated by the numeral 9. Screwed to the end of conduit 5 is the discharge valve 11. Linkage 13 provides control of the predetermining mechanism from the valve and also operates in the reverse direction to trip the discharge valve. The predetermining mechanism is mounted on a base 2 and is totally enclosed by a cover 19.

On the inlet side of the meter and fixed to the meter inlet conduit 3 is the throttling valve 15, connected with and controlled by the predeterminer through linkage 17.

Figure 4:
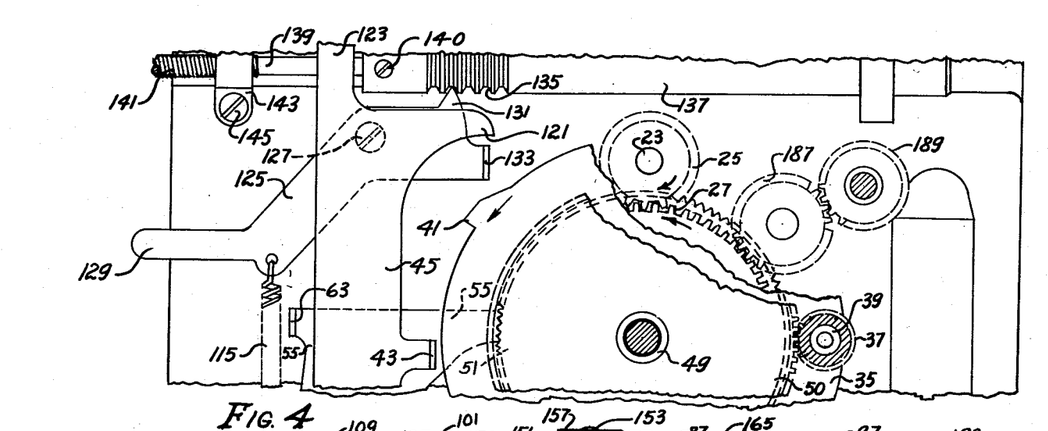
Figure 4 is horizontal section of the predeterminer taken substantially on line 4—4 of Figure 3, showing the latching and knockout assembly, the planetary gearing and its driving gear, and totalizer.

Looking down upon the predeterminer with the cover removed, the base 2 is fastened to the meter by cap screws 21. The predeterminer drive shaft 23 extends through the base and is connected to the meter output shaft (not shown) by the coupling 7 and revolves in a clockwise direction (Figure 4).

Swedged to the upper end of the predeterminer drive shaft 23 is an 18-tooth spur gear 25, meshing with the 54-tooth spur gear 27. The gear 27 revolves in a counterclockwise direction (Figure 4) and makes one revolution for each gallon of liquid metered.

Stationary sun gear and planetary stop assembly

Th assembly is composed of two sub-assemblies 29 and 47, which operate as a unit in resetting and independently while running toward the stop position in which tripping of the discharge valve is effected.

In the planetary stop assembly 29, the gear 27 is swedged to the bottom end of a hub 33 and is driven by gear 25 as the meter operates. Swedged to the top end of the spacer hub 33 is the planetary carrier 35 which carries a planet gear 37 rotatably mounted on post 39 riveted to the carrier near its periphery. Located 135° counter-clockwise from the planetary gear is the carrier knockout projection 41.

In the same plane as the carrier knockout projection is located an upturned ear 43 of the knockout bar 45, the operation of which will be described later.

Figure 3:
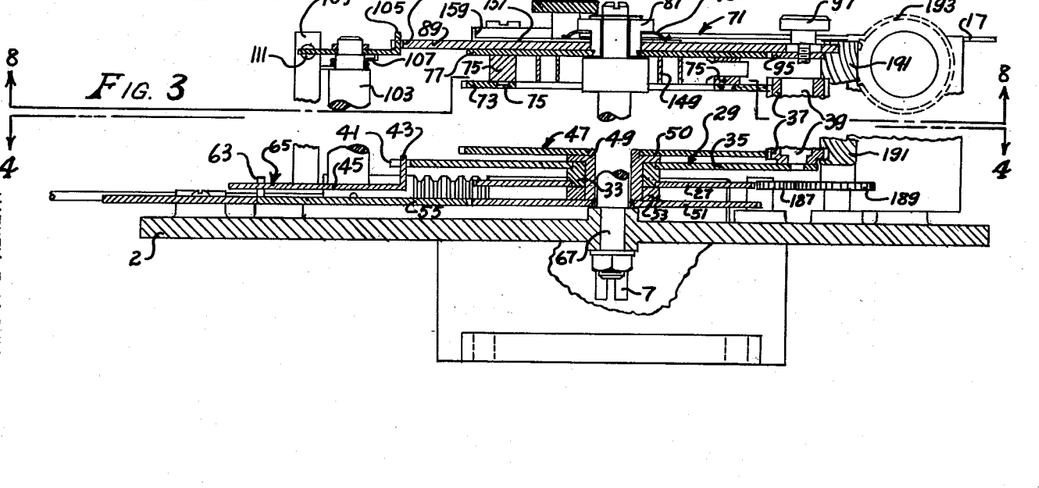
Figure 3 is a partially exploded sectional view of the predeterminer taken on line 3—3 of Figure 2, showing the planetary gearing, the knockout assembly, the reset assembly, the preset mechanism, and the control mechanism.

The stationary sun gear assembly, generally designated by the numeral 47, is composed of a hub 49, which forms a bearing for the spacer hub 33 of the planetary and knockout assembly, and which has fixed to it on top, the bastard 105-tooth spur gear 50 and at the bottom, the ratchet disc 51. The spacer 53 holds the hub 33 in proper position on hub 49. The gear 50 and the ratchet disc 51 are swedged to the top and bottom end of the hub 49 respectively and positioned as shown in Figure 3. The gear 50 meshes with the planetary gear 37. The gear 50, the ratchet disc 51, and the hub are held stationary during filling operations by the locking pawl 55 which engages the ratchet disc 51.

The locking pawl 55 is swedged to post 57 which is fulcrumed in the base (Figure 2) and is urged toward engagement with the ratchet disc by spring 61 which is attached at one end to the pawl and at the other to an angle clip 59 which is fixed to the base. The locking pawl is provided with an upraised projection 63 which is engaged by the trip bar assembly 65 for holding the locking pawl out of engagement with the ratchet disc during resetting. The stationary sun gear and planetary knockout assembly is rotatably mounted on the center post 67 which is fixed in the base 2.

The cumulative counter 183 fixed to the base 2 records the total amount of liquid dispensed in successive operations. The counter is driven through gear 25, gear 27, idler gear 187, spur gear 189 and spiral gears 191 and 193.

Knockout conditioning, reset and preset assembly

Rotatably mounted on the center post 67 directly above the gear 50 is the knockout conditioning, reset, and preset assembly, generally designated by the numeral 71. The lowermost piece of this assembly is a bastard 104 tooth spur gear 73 which meshes with the planetary gear 37.

Affixed to the gear 73 by means of spacer rivets 75 is the preset ratchet disc 77. The ratchet teeth are so arranged as to provide peripheral spacing for 104 teeth 76, however, only 100 teeth are cut. Every 5th notch is numbered from 5 to 95 in a counterclockwise direction as shown at 79 Figure 2. Welded or otherwise suitably fastened to the underside and extending beyond the periphery of the preset ratchet disc 77, is the reset zeroizing stop 81, Figure 2, its leading edge located 138° 30' in a clockwise direction from the first numerical tooth space. The zeroizing stop engages the stationary zeroizing stop 83, which forms a part of angle clip 59 which is fixed to the base, upon reset. These stops 81 and 83 position the mechanism for delivery of the succeeding quantity. The stop 83 is fixed to the base by means of screws 85 or other suitable means. The ratchet disc 77 is swedged to retainer knob 87 (Fig. 3). Directly above the ratchet disc and rotatably mounted on the retainer knob is the preset and knockout conditioning disc 89. In connection with the preset function of this disc 89 a peripheral slot 91 is formed therein and is positioned so that the tooth spaces and their numbers on the ratchet disc are visible through disc 89. Affixed to the under side of the preset disc near its periphery by means of rivet 93 is the preset locking dog 95, which swings in an arc to engage the ratchet disc, thus holding the ratchet disc and preset disc stationary in relation to each other. The dog 95 is held in place by means of a threaded shoulder lock screw 97 which extends through a second slot 99, which opens into slot 91, and screws into the locking segment. The shoulder of the lock screw forces the dog against the preset disc to lock it.

Figure 2:
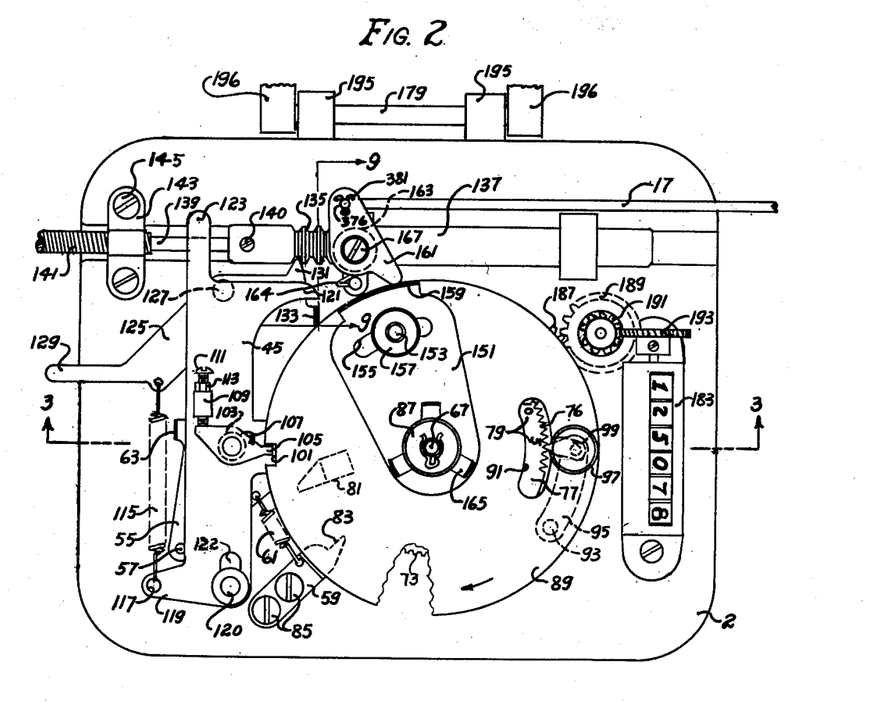
Figure 2 is a plan view of the predeterminer with the cover removed showing the control mechanism generally.

Substantially opposite the slot 91 is the knockout conditioning notch 101. Mounted on a post 103 on the knockout bar 45 and adapted to enter the conditioning notch is a conditioning pawl 105. Torsion spring 107 exerts a clockwise force (Figure 2) upon the conditioning pawl. Fixed to and rising above the knockout bar 45 is the block 109, which supports screw 111 and locking nut 113, which serve as an adjustment for the conditioning pawl. The tail of the pawl is held against the screw 111 by spring 107. A spring 115 is hooked through hole 117 which is punched into projection 119 adjacent the fulcrum 120 of the knockout bar 45 and tends to rotate bar 45 clockwise (Figure 2) to urge the conditioning pawl 105 against the disc 89. The knockout bar has an elongated fulcrum slot 122 which receives fulcrum 120 and spring 115 serves to hold the bottom of the slot against the fulcrum as shown in Figure 2. The conditioning pawl rides upon the periphery of the conditioning disc holding bar 45 and hence ear 43 of pawl 45 out of the path of the knockout projection 41 until the pawl 105 is engaged in the conditioning notch 101. As the latter rotates into position in a clockwise direction, the bar 45 rotates clockwise (Figs. 2 and 4) to allow the upturned ear 43 to come into the path of the carrier knockout projection 41, which moves the knockout bar longitudinally.

The knockout bar carries a projection 121 and a disengaging finger 123 on the end opposite the fulcrum slot. A latching and tripping lever 125 is fulcrumed on the base by shoulder screw 127 and is connected to and acted upon by spring 115 which rotates it in a counterclockwise direction (Figure 2). On this lever is arranged an emergency trip arm 129 which extends through a slot in the cover as shown in Figure 1. Located at the opposite end of the lever is the latching finger 131 and the tripping ear 133 which extends upward into the path of the projection 121 on bar 45.

The latching finger 131 is moved by spring 115 about its fulcrum to engage any of the circumferential notches 135 of the plunger 137. The latter is in turn connected to the discharge valve by the "Bowden" wire 139 encased in housing 141, the latter being fixed to the predeterminer base by clamp 143 and screws 145. The wire 139 is attached to the plunger 137 by a screw 140 or other device.

When the conditioning notch 101 moves into position where the conditioning pawl 105 enters the notch, the upturned ear 43 of the knockout bar 45 moves into the path of the carrier knockout projection 41 and the bar 45 is moved longitudinally. The bar projection 121 engages the tripping ear 133 and pulls the latching finger 131 out of engagement with the plunger notches 135. The plunger 137 and "Bowden" wire 139 are pulled toward the left in Figures 2 and 4 by a spring 147 affixed to the discharge nozzle (later to be described) and the plunger moves the disengaging finger 123 to the left, thereby engaging the upraised projection 63 of the ratchet locking pawl 55 and disengaging the pawl from the locking ratchet disc 51 to effect resetting of the notch 101 of disc 89 as will be described.

Clock spring 149 is located between the gear 73 and the preset ratchet 77 in a chamber formed by gear 73 and rivets 75. One end of the spring is anchored in the center post 67 and the other end hooked behind one of the spacer rivets 75. The clock spring is wound up as the spacer rivets and disc 89 move in a clockwise direction (Figures 2 and 4) toward the knockout position and upon release of the pawl 55 from locking ratchet 51, furnishes the counterclockwise force for resetting the mechanism for repeat quantities. As soon as the knockout disengages the locking pawl, the entire mechanism, mounted on the center post, is motivated by the clock spring to move to the zero position, which is established by the zero stops 81 and 83.

The throttling cam 151 (Figure 2) is rotatably mounted on the retainer knob 87 for movement thereabout. The range of movement is limited by the stud 153 which projects through an arcuate slot 155 in the cam. The stud is riveted to the disc 89 and threadedly engages a locking thumb nut 157 for holding the cam in its adjusted position. An upturned flange 159 on the peripheral edge of the cam contacts the throttling trip finger 161, which is mounted by shoulder screw 167 on post 163 which is fixed to the base 2. The trip finger 161 is connected by suitable linkage to the throttling valve, both of which will be described later. A spring 164 contacts the post and the trip finger and serves to hold the latter in position to be actuated by the flange 159.

A spring 165 mounted under the head of the retainer knob exerts a braking action on disc 89.

Hinged to the base by pin 179 extending through lugs 195 on the base and lugs 196 on the cover, is the predeterminer cover 19.

*Discharge valve assembly*

Figures 5, 9:
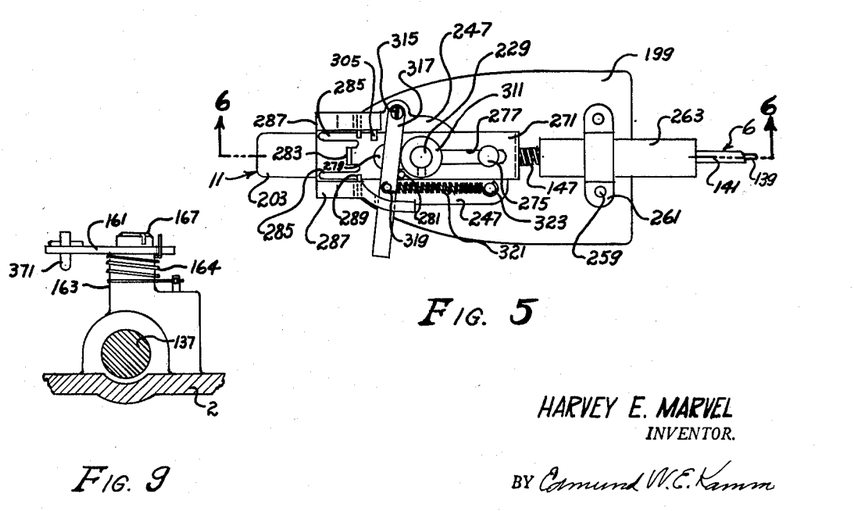
Figure 5 is a plan view of the discharge valve and its control mechanism.
Figure 9 is a sectional view taken on the line 9—9 of Figure 2, showing the predetermined base, the notched plunger, throttling trip finger, torsion spring, and linkage leading to the throttling valve.
Figure 6:
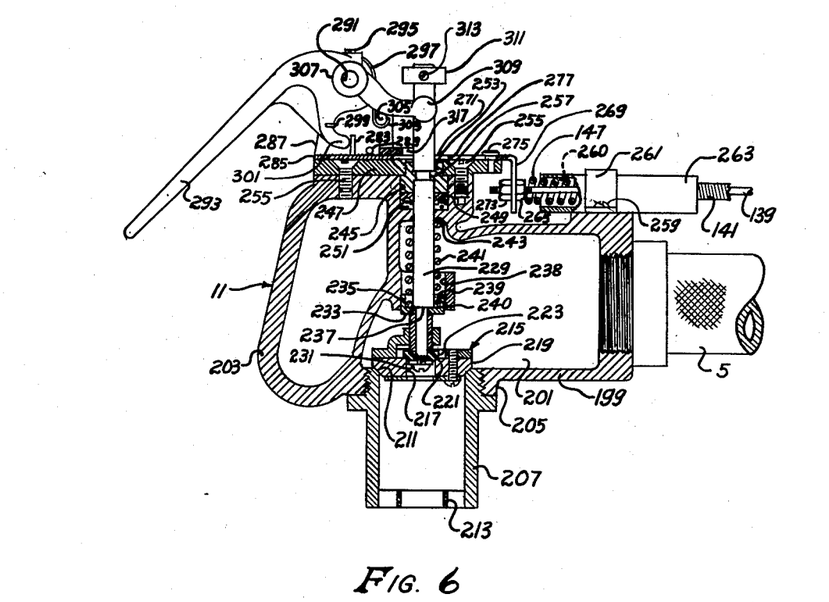
Figure 6 is a sectional view of the discharge valve in its closed position taken on line 6—6 of Figure 5.

Fixed to conduit 5, which is a flexible hose, is the discharge valve 11, plan and sectional views of which are shown in Figures 5 and 6 respectively.

The body 199 of the valve comprises the chamber 201, the handle 203 and boss 205. Screwed into the boss 205 is the discharge nozzle 207. A valve seat 211 is machined into the upper portion of the nozzle. Located at the discharge end of the nozzle is a straightener grill 213 which prevents dripping after shutoff and prevents splashing of the liquid leaving the nozzle.

In the valve 215 is a conventional double poppet composed of the large poppet valve 219 and a small poppet valve 223, which controls an opening 217 in the large valve, which has a seat 221 formed at the upper end.

The small poppet 223 is mounted on the shouldered valve shaft 229 by screw 231. Shoulder 233 provides a gearing for the poppet guide 235 which is held by spacer 237 between the guide and the small poppet. The guide rides in a guideway 238 formed in a boss 240 of the valve body. The guide provides a seat 239 for compression spring 241 which bears upon the face 243 of the valve body to exert a force which retains the valve 223 on its seat and thereby forces valve 219 to closed position. The object of the double valve is to permit opening of the large valve with less effort by first opening the small valve, since both open against pressure.

The valve shaft 229 extends through a sealing device 245 comprising a hydraulic cup 249, a compression spring 251 and a retainer bushing 253, which are held in position by a bracket 247. The bracket is secured to the body by screws 255 and supports the predeterminer reset and valve tripping mechanism which will be described later.

Formed in the valve shaft 229 is a circumferential groove 257 which is disposed below the surface of the bracket when the valve is closed and slightly above the surface when the valve is open. This groove receives one edge of a latch bar to hold the valves open.

Monuted on the valve body by screws 259 and clamp 261 is the spring guide 263, which serves as an anchor for one end of the "Bowden" wire housing 141 and is also recessed at 260 to form a seat and a guide for compression spring 147.

The "Bowden" wire 139 extends through the spring and its guide and into an externally threaded connection 265, which is suitably secured to the "Bowden" wire. The threaded portion of the connection is then inserted through a hole in a depending leg 269 of the predeterminer reset and valve knockout slide 271 and receives nuts 273 on each side of the leg which serve to transmit the thrust of the spring to the slide and vice versa. The spring 147 tends to pull the "Bowden" wire 139 to the left (Figures 5 and 6) and to pull the plunger 137 (Figures 2, 3 and 4) also to the left. The compression of the spring may be altered by moving guide 263 in the clamp 261.

The slide 271 is secured to the bracket 247 for longitudinal movement which extends through an elongated slot 277 of the slide. Slot 279 is an enlarged continuation of slot 277 and enables the slide to freely straddle the valve shaft 229. A knockout pin 281 is riveted to the slide adjacent to the slot 279. An upturned reset projection 283 and guide legs 285, which extend between the upturned projections 287 forming a part of the bracket 247, are formed on the end of slide 271.

Guide pins 289 project in from the sides of the projections 287 and extend over the guide legs 285 to hold the slide down against the bracket.

Fulcrum pin 291 (Figure 6) extends through the valve lever 293 and is journaled in projections 287 formed on the bracket 247. Set screw 295 secures the lever to the pin 291. Torsion spring 297 with one end 299 hooked behind the reset cam 301 formed as a part of the lever 293, and with the other end 303 hooked on the spring post 305 projecting from one side of the bracket 247, is coiled around the lever hub 307 and imparts a clockwise force upon the lever.

The reset cam 301 controls the positioning of projection 283 and any downward movement imparted to the handle of the lever 293 moves the slide 271 and the "Bowden" wire 139 toward the right in Figures 1, 2, 4, 5 and 6.

Mounted upon the bracket 247 by means of a shouldered stud 315 is the latch bar 317 which extends over and beyond the slide 271. Spring post 319 extends upward from, and is riveted to, the latch bar 317. Spring 321 hooks over spring post 319 and spring post 323, secured in the bracket 247 to hold the latch bar in yieldable contact with the valve shaft 229.

As the valve lever 293 is urged toward the nozzle handle 203 (Figure 6) the yoke 309 engages the collar 311 which is secured to shaft 229 by set screw 313 and raises the valve shaft 229, lifting first valve 223 and then valve 219, and also lifting the groove 257 into the same plane as the latch bar 317, which is urged into the groove by spring 321, where it remains until it is tripped by the movement of slide 271 and pin 281 to the left in Figure 5.

Manual or emergency closing of the valve is effected by manually pulling latch bar 317 from the groove 257 against the action of spring 321.

*Throttling valve*

Figure 7:
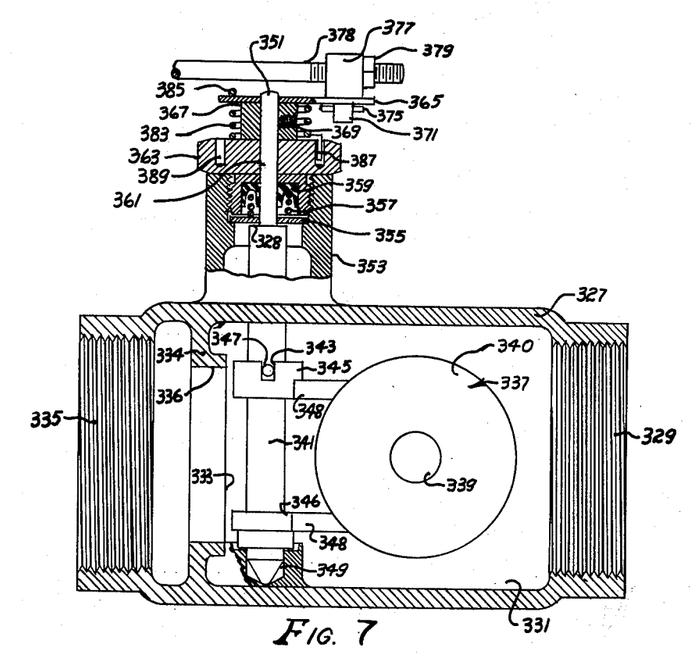
Figure 7 is a sectional view of the throttling valve in its open position, taken on line 7—7 of Figure 1.
Figure 8:
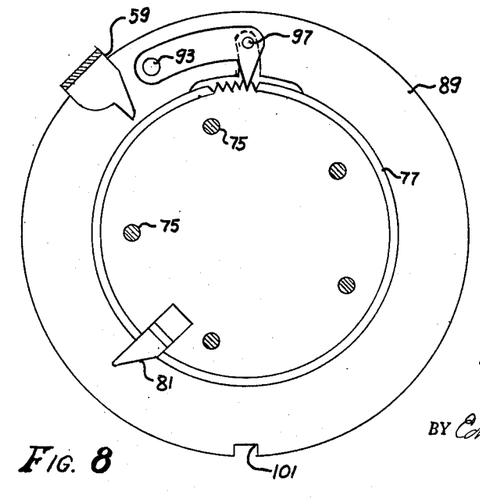
Figure 8 is a horizontal section of the predeterminer taken substantially on line 8—8 of Figure 3, showing the zero stops, the preset mechanism, and the conditioning disc.

Affixed to the inlet conduit 3 of the meter and controlled by the predeterminer is the throttling valve 15 shown in its open position in Figure 7 of the drawings.

Valve body 327 has an inlet to chamber 331 and an outlet 335. A flat valve seat 333 machined on the partition 334 extends across the chamber and is provided with a port 336.

A flap valve 337 has an orifice 339 formed therein and a seat engaging surface 340. Fixed to a shouldered shaft 341 by means of slot 343 and a pin 347 which extends through the shaft and engages the slot in a hub 345. A second hub 346 is mounted on the shaft. Both hubs carry arms 348 which support the valve 337 in position to swing over seat 333 and to close the port 336.

The lower end of the shaft is journaled in the body at 349 while the upper end has a reduced portion 361 which extends through a boss 353 formed on the body 327. Washer 355 rests on the shoulder 328 to support the spring 357 which expands the hydraulic cup packing 359, to seal journal 361 in packing gland 363 which screws into the boss 353.

Segment 365 is swedged to hub 367 and secured as a unit to shaft 341 by set screw 369.

The shouldered trip rod stud 371 extends through the radial slot 373 of the segment and is secured by cotter key 375. The square portion 377 of the stud is rotatably mounted above the segment through which extends the threaded portion of rod 378, adjustably secured by nut 379. The opposite end of rod 378 is bent upward, inserted through a hole 376 in the slow down pawl 161 (Figure 2) and secured by cotter key 381.

A torsion spring 383 is coiled about the segment hub 367 and one end 385 thereof is hooked behind the segment 365, while the other end 387 is inserted into one of multiplicity of holes 389 in the packing gland 363 providing for adjustable tensioning of the spring.

*Operation*

The apparatus described in the foregoing specifications may be installed for either gravity or pump operation.

Preliminary to operation, the operator selects the quantity to be repeatedly delivered by loosening the thumb screw 97 and swinging the locking segment 95 out of engagement with ratchet disc 77. The preset disc 89 is rotated in a counter-clockwise direction by means of the thumb screw, until the segment is directly in line with the proper tooth space of the preset ratchet disc 77. The segment 95 is then engaged with the tooth space and the thumb screw tightened until its shoulder firmly grips the preset disc.

Each tooth space moved will move the conditioning notch 101 on the preset disc the equivalent of one gallon away from the conditioning pawl 105, thereby increasing or decreasing the predetermined quantity by one gallon for each tooth space.

Having set the predetermined quantity, the operator will now adjust the throttling valve cam 151. The location of the cam determines the point at which throttling begins. The cam can be adjusted to throttle the liquid flow throughout the last one to ten gallons. When the cam is advanced to its limit in a clockwise direction (Figure 2), the throttling will begin at approximately ten gallons prior to shut off.

The operator places the nozzle 207 of the discharge valve in the fill opening of a container and depresses the lever 293 toward the valve handle 203 (Figure 6). The initial motion of the lever pushes the valve slide 271, the Bowden wire 139 and the notched plunger 137 on the predeterminer (Figures 2 and 6) longitudinally permitting the disengaging finger 123, formed as a part of the knockout bar 45, to be pulled in a clockwise direction (Figure 2) by spring 115. The knockout bar moves away from the raised projection 63 on the locking pawl 55, and spring 61 pulls the pawl 55 into engagement with the locking ratchet 51 (Figures 3 and 4), thereby locking the stationary sun gear assembly 47.

Further downward motion of the discharge valve lever pushes the valve slide 271, Bowden wire 139 and predeterminer plunger 137 until the latching finger 131 of the latching and tripping lever 125, acted upon by spring 115, drops into one of the circumferential notches 135 on the plunger. A series of notches are provided to compensate for variations in length of the Bowden wire due to the flexing which takes place in varying degree as the discharge nozzle is moved about.

Simultaneously, with the last-mentioned movement of the valve handle, the yoke 309 formed as a part of the lever 293, engages the under side of the collar 311, raising the valve shaft 229. The shaft first opens the small poppet 223 which in turn raises the large poppet 219. Opening of the smaller poppet 223 first relieves the pressure on the large poppet, thus rendering the lever 293 easy to operate. The circumferential notch 257 in the valve stem rises to a point where the latch bar 317, actuated by spring 321, slips into the notch and holds both poppets open.

The initial opening of the valve starts delivery of the liquid to the container. The flow of liquid through the meter actuates the meter output shaft, coupling 7, shaft 23 and gear 25 in a clockwise direction (Figure 4). Gear 25 drives gear 27 in a counter-clockwise direction (Figure 4) and the hub 33, carrier 35 and planet gear 37 are driven in the same direction. However, the planet gear meshes with both gear 50 and gear 73 and revolves in a counter-clockwise direction on its shaft 39. Gear 50 has 105 teeth and is held against rotation by the pawl 55 during delivery while gear 73 has 104 teeth and is free to rotate during delivery. Thus, as the planet gear is revolved by the carrier, the gear 73 will be advanced in a clockwise direction (Figure 2), one tooth for each revolution of the carrier. The carrier in turn makes one revolution per gallon discharged by the meter.

The knockout conditioning disc 89 is fixed to and rotated with the preset ratchet disc 77 by means of pawl 95 as described above, and disc 77 is fixed to gear 73 so that the disc 89 will also rotate in a clockwise direction. The spring 149 is wound as this movement takes place.

As the conditioning disc 89 moves clockwise, the throttling cam flange 159 gradually advances toward the throttling trip finger 161. The trip finger is normally held in engaging position by spring 383 on the throttling valve (Figure 7), and when the flange 159 pushes the finger 161, it imparts to it a counter-clockwise motion which is transmitted by the link 17 to the throttling valve. This draws the flapper 337 out into the stream of liquid which forces the flapper against seat 333 and limits the flow of liquid to that which is able to pass through the port 339 in the flapper. As the flow of liquid is reduced, the meter and predeterminer slow down.

While the conditioning disc 89 is revolving, the conditioning pawl 105 attached to the knockout bar 45 rides upon the periphery of the conditioning disc, contact being maintained by the springs 107 and 115. As long as the conditioning pawl rides upon the periphery of the conditioning disc, the upturned knockout ear 43 (Figures 3 and 4) of the knockout bar 45, is held out of reach of the peripheral knockout projection 41 on the planetary carrier 35.

As the conditioning notch 101 of the disc 89 revolves into a position directly opposite the conditioning pawl 105, the latter drops into the notch and the upturned knockout bar ear 43 moves into the path of the knockout projection 41. Torsion spring 107 permits counter-clockwise motion of the conditioning pawl 105 (Figure 2) so that it will remain in the notch as the carrier 35 completes its final revolution.

The notch 101 is so located on the disc 89 that the pawl 105 engages the notch 101 while the last predetermined gallon is being delivered; that is sometime after the carrier projection 41 has passed the knockout bar ear 43.

As the projection 41 makes its last revolution, it strikes the ear 43 and moves the knockout bar 45 longitudinally.

The knockout bar projection 121 engages the tripping ear 133 of latching lever 125, disengaging the latching finger 131 from the plunger notches 135.

The spring 147 on the discharge valve exerts a pulling force upon the Bowden wire 139 and the plunger 137 and a pushing force upon the valve slide 271. The knockout pin 281 mounted on one side of the discharge valve shaft strikes and disengages the valve latching bar 317 from the notch 257 in the shaft 229, and spring 241 snaps the valve shut, completing the delivery of the predetermined quantity of liquid.

As the predeterminer plunger 137 moves toward the discharge valve, it engages the knockout bar disengaging finger 123, moving the bar about its fulcrum 120. The bar engages the upturned projection 63 of the locking pawl 55 and disengages the pawl 55 from the ratchet disc 51. Clock spring 149 which has been wound up during the delivery, now supplies the necessary torque to revolve the knockout conditioning assembly and the stationary sun gear and planetary assembly in a counter-clockwise direction until the zero stop 81 strikes the stationary stop 83 mounted on the base.

The gear 27 and planetary carrier 35 are, of course, held stationary during the resetting operation, since they are geared directly to the meter which was stopped upon closure of the valve. The release of the ratchet 51, however, permits the spring 149 which was wound during delivery, to drive gears 73, 37, 47 and the ratchet 55 in a counter-clockwise direction (Figures 2 and 4) until the stop 81 on disc 77 strokes fixed stop 89. This resets the notch 101 relative to pawl 105 and when the valve is again opened, the same quantity will be delivered.

The flange 159 on the throttling cam is relatively long so that there is no danger of the trip finger 161 getting behind it and preventing the resetting movement.

In the event it is necessary to stop the delivery before the predetermined amount has been dispensed, as is sometimes the case when someone has failed to drain a container entirely, the operator, who is usually stationed at the nozzle, merely pulls the lever 317 out of the groove 251, and the valve closes.

If the operator desires to run out the remainder of the predetermined quantity, he needs only to operate the valve lever 293 to reopen and relatch the valve. However, if it is desired to start a new quantity, the operator must first actuate lever 129 (Figure 2) to reset the mechanism.

The lever 129 may be used to stop the delivery by releasing the plunger 137 and causing the valve to be closed in normal manner. However, if this lever is used in an emergency, it will be impossible to thereafter complete the quantity because the resetting of the mechanism is accomplished automatically upon the operation of finger 123 by the plunger.

The register 183 is actuated only by the meter and thus accumulates the total of all of the gallons dispensed by the meter.

Repetition of the predetermined quantities is continued until such time as it is desired to change the predetermined quantity.

What I claim to be new and desire to protect by Letters Patent of the United States is:

1. In a liquid dispensing mechanism, a flow line, a meter in said flow line, a stop mechanism driven by the meter, a shut off valve in said flow line downstream of the meter, a normally open throttling valve in said flow line upstream of the meter, and means actuated by said stop mechanism for operating said throttling valve and for thereafter closing said shut off valve.

2. In a liquid dispensing mechanism, a flow line, a meter in said flow line, a stop mechanism driven by the meter, a shut off valve in said flow line, a normally open throttling valve in said flow line upstream of said shut-off valve, and means actuated by said stop mechanism for operating said throttling valve and means for thereafter closing said shut off valve.

3. In a liquid dispensing mechanism, a flow line, a meter in said flow line, a stop mechanism driven by the meter, a shut off valve in said flow line, a normally open throttling valve in said flow line upstream of said shut-off valve, having open and closed positions and adapted to reduce the flow through said flow line when it occupies the closed position, and means actuated by said stop mechanism for operating said throttling valve toward closed position and means for thereafter closing said shut off valve.

4. In a liquid dispensing apparatus, the combination of a meter having a flow line comprising an inlet conduit in communication with a liquid source and a discharge conduit, repeat quantity predetermined stop means driven by said meter, a discharge valve communicating with said discharge conduit, a throttling valve in said flow line, and control means actuated by said predetermining means for operating said discharge valve and said throttling valve, and means for resetting said throttling valve after said discharge valve is closed.

5. In a liquid dispensing apparatus, the combination of a flow line, a meter in said line, a predetermined stop mechanism connected to be driven by said meter, means connected for operation by said stop mechanism to stop the flow of liquid in said line, a normally open valve in said line in advance of said flow stopping means having full open and flow reducing positions, said valve being constructed and arranged for operation by the flow of liquid, means for normally holding said valve out of the flow of liquid and means actuated by said predetermining means for moving said valve into the flow of liquid for operation thereby to flow reducing position prior to the operation of said flow stopping means.

6. In a liquid dispensing apparatus the combination of a flow line, a meter in the line, a stop mechanism connected to be driven by the meter, means for reducing the flow of liquid through said flow line comprising a valve having a pivot disposed adjacent one edge, said pivot being disposed downstream of the other edge, said valve being adapted for movement between a position substantially parallel with and on one side of the flow line and a position transverse to said flow line, means for yieldably holding said valve in said parallel position and means connected for actuation by said stop mechanism for moving said valve into said stream for actuation by said stream into the transverse position.

7. In a predetermined stop apparatus, the combination of a liquid meter having an inlet and an outlet, predetermined stop means, adapted to be conditioned so as to repeat a predetermined quantity, connected to be driven by said meter, valve means, including a valve, in communication with said meter outlet, means for closing the valve, trip means on said valve adapted to hold the valve open and operable to release the valve for closure, connecting means, movable in opposite longitudinal directions by said valve means and stop means, disposed between said trip means and said stop means, said connecting means being adapted for actuation by the valve means to condition said stop means for operation when moved in one direction, and to actuate said trip means to release said valve when moved in the opposite direction by said stop means.

8. In a predetermined stop apparatus, the combination of a liquid meter having an inlet conduit and flexible outlet conduit, predetermined stop means driven by said meter, a normally closed discharge valve attached to said outlet conduit, releasable means on said valve for latching said valve open, flexible, mechanical control means connecting said stop means and said valve, means operated by said stop means for actuating said control means, and means actuated by said control means for releasing said latching means.

9. In a presettable predetermined stop mechanism, the combination of a control member having running and stop positions, releasable means for holding said member in running position, means for releasing said holding means, said releasing means having neutral and operative positions, a driven unit, a driving unit connected to drive said driven unit, means on said driven unit adapted to hold said releasing means in neutral position except in a predetermined position, means for moving said releasing means into operative position when said predetermined position is reached, knockout means on said driving unit adapted to actuate said releasing means when it occupies its operative position to release said holding means.

10. In a presettable predetermined stop mechanism, the combination of a control member having running and stop positions, releasable means for holding said member in running position, means for releasing said holding means, said releasing means having neutral and operative positions, a control element, a driving element, speed reducing means connecting said driving element to drive said control element, said control element being adapted to hold said releasing means in neutral position except in one predetermined position, means for moving said releasing means in operative position when said predetermined position is reached, knockout means on said driving element adapted to actuate said releasing means when it occupies its operative position, to release said holding means.

11. In a presettable predetermined stop mechanism the combination of a control member having running and stop positions, releasable means for holding said member in running position, means for releasing said holding means, said releasing means having neutral and operative positions, a driven unit comprising a first sun gear, a driving unit comprising a planet gear and planetary carrier, a second stationary sun gear, said planet gear being in mesh with both sun gears, means on said driven unit adapted to hold said releasing means in neutral position except in one predetermined position, means for moving said releasing means into operative position when said predetermined position is reached, knockout means on said driving unit adapted to actuate said releasing means when it occupies its operative position to release said holding means.

12. In a presettable predetermined stop mechanism the combination of a control member having running and stop positions, releasable means for holding said member in running position, means for releasing said holding means, said releasing means having neutral and operative positions, a driven unit comprising a first sun gear, a driving unit comprising a planet gear and planetary carrier, a second stationary sun gear, said second sun gear having one tooth less than said first sun gear, said planet gear being in mesh with both sun gears, means on said driven unit adapted to hold said releasing means in neutral position except in one predetermined position, means for moving said releasing means into operative position when said predetermined position is reached, knockout means on said driving unit adapted to actuate said releasing means when it occupies its operative position to release said holding means.

13. In a presettable predetermined stop mechanism the combination of a control member having running and stop positions, releasable means for holding said member in running position, means for releasing said holding means, said releasing means having neutral and operative positions, a driven unit comprising a first sun gear, means to establish a starting position for said unit, a driving unit comprising a planet gear and planetary carrier, a second stationary sun gear, said planet gear being in mesh with both sun gears, control means on said driven unit adapted to hold said releasing means in neutral position except in one predetermined position, means for moving said releasing means into operative position when said predetermined position is reached, knockout means on said driving unit adapted to actuate said releasing means when it occupies its operative position to release said holding means, and means for resetting said driven unit to starting position.

14. In a presettable predetermined stop mechanism, the combination of a control member having running and stop positions, releasable means for holding said member in running position, means for releasing said holding means, said releasing means having neutral and operative positions, a driven unit having a starting position and comprising a sun gear and control means, a driving unit comprising a planet gear and planetary carrier, a second movable sun gear, said planet gear being in mesh with both sun gears and being adapted to drive the driven unit in one direction, releasable means for locking said second sun gear stationary, power means connected to return said driven unit in the opposite direction, said control means being adapted to hold said releasing means in neutral position except in one predetermined position, means for moving said releasing means into operative position when said predetermined position is reached, knockout means on said driving unit adapted to actuate said releasing means when it occupies its operative position to release said holding and said locking means, and means for stopping said driven unit at the starting position when it is returned by said power means.

15. In a presettable predetermined stop mechanism, the combination of a control member having running and stop positions, releasable means for holding said member in running position, means for releasing said holding means, said releasing means having neutral and operative positions, a driven unit having a starting position and comprising an adjustable control element having a trip means, a driving unit, speed reducing means driven by said driving unit, and connected to drive said driven unit away from said starting position, restraining means on said releasing means cooperating with said control means to hold said releasing means in neutral position except when said trip and restraining means are aligned, means for moving said releasing means into operative position upon alignment of said trip and restraining means, knockout means on said driving unit adapted to actuate said releasing means when it occupies its operative position, to release said holding means, and power means for returning said driven unit to the starting position.

16. In a presettable predetermined stop mechanism, the combination of a control member having running and stop positions, releasable means for holding said member in running position, means for releasing said holding means, said releasing means having neutral and operative positions, a driven unit having a starting position and comprising an adjustable control element having a trip means, a driving unit, speed reducing means driven by said driving unit, and connected to drive said driven unit away from said starting position, restraining means on said releasing means cooperating with said control means to hold said releasing means in neutral position except when said trip and restraining means are aligned, means for moving said releasing means into operative position upon alignment of said trip and restraining means, knockout means on said driving unit adapted to actuate said releasing means when it occupies its operative position, to release said holding means, and power means rendered operable by movement of said control member to stop position for returning said driven unit to the starting position.

17. In a presettable predetermined stop mechanism, the combination of a control member having running and stop positions, releasable means for holding said member in running position, means for releasing said holding means, said releasing means having neutral and operative positions, a driven unit having a starting position and comprising an adjustable control element having a stopping station, a driving unit, speed reducing means driven by said driving unit, and connected to drive said driven unit away from said starting position, follower means on said releasing means, cooperating with said control element to hold said releasing means in neutral position, means for moving said releasing means into operative position when said follower means engages said station, knockout means on said driving unit adapted to actuate said releasing means when it occupies its operative position, to release said holding means.

18. In a presettable predetermined stop mechanism the combination of a control member having running and stop positions, releasable means for holding said member in running position, means for releasing said holding means comprising a driven unit comprising a rotatably mounted member having a stop and a ratchet, a control member rotatably mounted on said member, having a locking pawl adapted to enter said ratchet and having a trip device, whereby said trip device may be moved to one of a number of different positions relative to said stop, a driving unit, speed reducing means connecting said driving unit to drive said driven unit so as to advance it the distance of one ratchet tooth for each rotation of the driving unit, a holding means actuator having neutral and active positions and adapted to be engaged and held in neutral position by said control element, means for moving said holding means actuator into active position when it is engaged by said tripping device, knockout means on said driving unit adapted to actuate said holding means actuator when it occupies the active position, whereby to release said holding means.

19. In a presettable predetermined stop mechanism, the combination of a control member having running and stop positions, releasable means for holding said member in running position, means for releasing said holding means comprising a driven unit comprising a rotatably mounted member having a stop and a ratchet, a control member rotatably mounted on said member, having a locking pawl adapted to enter said ratchet, and having a trip device whereby said trip device may be moved to one of a number of different positions relative to said stop, a driving unit, speed reducing means connecting to drive said driven unit so as to advance it the distance of one ratchet tooth for each revolution of the driving unit, holding means actuator having neutral and active positions and adapted to be engaged and held in neutral position by said control element, means for moving said holding means actuator into active position when it is engaged by said tripping device, knockout means on said driving unit adapted to actuate said holding means actuator when it occupies the active position, whereby to release said holding means, a fixed abutment in the path of said stop and means for resetting said driven unit to the position determined by said stop and said abutment.

20. In a presettable predetermined stop mechanism, the combination of a control member having running and stop positions, releasable means for holding said member in running position, means for releasing said holding means comprising a driven unit comprising a rotatably mounted member having a stop and a ratchet, a control member rotatably mounted on said member, having a locking pawl adapted to enter said ratchet, and having a trip device whereby said trip device may be moved to one of a number of different positions relative to said stop, a driving unit, disengageable speed reducing means connecting to drive said driven unit so as to advance it the distance of one ratchet tooth for each revolution of the driving unit, holding means actuator having neutral and active positions and adapted to be engaged and held in neutral position by said control element, means for moving said holding means actuator into active position when it is engaged by said tripping device, knockout means on said driving unit adapted to actuate said holding means actuator when it occupies the active position, whereby to release said holding means, a fixed abutment in the path of said stop and means for resetting said driven unit to the position determined by said stop and said abutment comprising means under control of said control member for disengaging said speed reducing means.

21. In a presettable predetermined stop mechanism, the combination of a control member having running and stop positions, releasable means for holding said member in running position, means for releasing said holding means comprising a driven unit comprising a rotatably mounted member having a stop and a ratchet, a control member rotatably mounted on said member, having a locking pawl adapted to enter said ratchet, and having a trip device whereby said trip device may be moved to one of a number of different positions relative to said stop, a driving unit, disengageable speed reducing means connecting to drive said driven unit so as to advance it the distance of one ratchet tooth for each revolution of the driving unit, holding means actuator having neutral and active positions and adapted to be engaged and held in neutral position by said control element, means for moving said holding means actuator into active position when it is engaged by said tripping device, knockout means on said driving unit adapted to actuate said holding means actuator when it occupies the active position, whereby to release said holding means, a fixed abutment in the path of said stop and means for resetting said driven unit to the position determined by said stop and said abutment comprising means under control of said control member for disengaging said speed reducing means, and power means acting on said driven unit.

22. In a liquid dispensing mechanism, a flow line, a meter in said flow line, a stop mechanism driven by the meter, a shut-off valve in said flow line, a throttling valve in said flow line adapted to move from open to throttling position, means actuated by the stop mechanism for causing said throttling valve to move toward throttling position, said valve being constructed and arranged so that the movement to throttling position is completed by the flow of liquid, means under control of the stop mechanism for thereafter closing said shut-off valve and means, operable only after the cessation of flow of liquid through the line, for restoring said throttling valve to open position.

23. In a liquid dispensing mechanism, a flow line, a meter in said flow line, a stop mechanism driven by the meter, a shut-off valve in said flow line, a throttling valve in said flow line adapted to move from open to throttling position, means actuated by the stop mechanism for causing said throttling valve to move toward throttling position, said throttling valve being constructed and arranged to thereafter close in response to the flow of liquid in the line, means for thereafter closing said shut-off valve and means, operable only when flow in the line has ceased, for automatically restoring said throttling valve to open position.

HARVEY E. MARVEL.

REFERENCES CITED

The following references are of record in the file of this patent:

UNITED STATES PATENTS

| Number | Name | Date |
| --- | --- | --- |
| 1,929,407 | Blum | Oct. 10, 1933 |
| 1,996,944 | Witter | Apr. 9, 1935 |
| 2,265,325 | Stein | Dec. 9, 1941 |